United States Patent [19]

Hensley

[11] Patent Number: 4,722,542
[45] Date of Patent: Feb. 2, 1988

[54] TRAILER HITCH ASSEMBLY

[76] Inventor: James C. Hensley, R.R. 2, Box 150, Centralia, Ill. 62801

[21] Appl. No.: 819,590

[22] Filed: Jan. 17, 1986

Related U.S. Application Data

[63] Continuation-in-part of Ser. No. 692,398, Jan. 18, 1985, abandoned.

[51] Int. Cl.$^4$ .............................................. B60D 1/06
[52] U.S. Cl. ................................ 280/447; 280/456 R; 280/460 R
[58] Field of Search ............... 280/504, 406 A, 446 B, 280/406 R, 456 R, 446 R, 447, 478 B, 460 R

[56] References Cited

U.S. PATENT DOCUMENTS

| | | | |
|---|---|---|---|
| 2,133,065 | 10/1938 | Weber | 280/504 |
| 2,444,944 | 7/1948 | Minter | 280/456 |
| 2,940,776 | 6/1960 | Curtis | 280/446 B |
| 3,645,560 | 2/1972 | Steele | 280/482 |
| 3,751,069 | 8/1973 | Suckow | 280/406 A |
| 3,787,068 | 1/1974 | Miller | 280/446 R |
| 3,796,443 | 4/1974 | Crutchfield | 280/406 A |
| 3,891,237 | 6/1975 | Allen | 280/477 |
| 4,019,754 | 4/1977 | Hinckley | 280/456 R |
| 4,106,794 | 8/1978 | Sallis | 280/456 |
| 4,178,011 | 12/1979 | Kirsch | 280/477 |
| 4,198,073 | 4/1980 | Olsen | 280/406 |
| 4,253,680 | 3/1981 | Albright | 280/479 R |
| 4,312,516 | 1/1982 | Olsen | 280/406 |
| 4,502,562 | 3/1985 | Kober | 280/446 |
| 4,560,184 | 12/1985 | Williams, Jr. | 280/478 |
| 4,606,549 | 8/1986 | Williams, Jr. | 280/478 |
| 4,613,149 | 9/1986 | Williams, Jr. | 280/508 |

OTHER PUBLICATIONS

Reece, "Principles of Weight-Distributing and Sway Resistant Hitches", Jan. 18, 1985.

Primary Examiner—John A. Pekar
Assistant Examiner—Charles R. Watts
Attorney, Agent, or Firm—Gravely, Lieder & Woodruff

[57] ABSTRACT

A hitch assembly for coupling a trailer to a tow vehicle includes a mounting member positioned firmly at the rear of the tow vehicle, another mounting member connected to the tongue of the trailer such that it will not turn relative to the trailer about a vertical axis, and a pair of short connecting links which extend between the two mounting members and are pivotally connected to each. The connecting links are of equal length and converge forwardly. This has the effect of placing the effective pivot point for the trailer ahead of the actual hitch assembly, which in turn enhances the stability of the combination tow vehicle and trailer, rendering it less susceptible to swaying or fishtailing in the presence of side winds.

22 Claims, 10 Drawing Figures

TRAILER HITCH ASSEMBLY

RELATED APPLICATION

This application is a continuation-in-part of application Ser. No. 692,398 of James C. Hensley, filed Jan. 18, 1985, now abandoned and entitled TRAILER HITCH ASSEMBLY.

BACKGROUND OF THE INVENTION

This invention relates in general to trailers and more particularly to a hitch assembly for coupling a trailer to a tow vehicle.

Automobiles and pick-up trucks have long been used to tow trailers, and in the typical combination the trailer is connected to the tow vehicle through a ball and socket coupling located at the rear of the tow vehicle. More specifically, the tow vehicle is fitted with a hitch ball which projects upwardly in the region of the rear bumper for that vehicle, while the trailer at the end of its tongue has a socket which fits over and closes around the hitch ball, thereby securing the trailer to the tow vehicle such that the trailer may turn relative to the tow vehicle, rock forwardly and rearwardly with respect to the tow vehicle, and also rock left and right with respect to the tow vehicle, or in other words undergo a universal pivoting movement.

The offset of the hitch from the rear axle of the tow vehicle detracts from the overall stability of the combination, particularly at higher speeds, for it enables wind induced forces to cause a swaying motion known as fishtailing. The wind may amount to nothing more than a simple surface wind of the type often present, particularly in the plains states, or it may be gusts of the type experienced during storms. The wind may also be generated by a large over-the-road truck traveling at high speed, for such a vehicle will displace a considerable amount of air and create turbulence that affects any other vehicle which happens to be along side of it. Inertial forces created by uneven road surfaces may also produce fishtailing. Typical of this type of road surface is a shoulder onto which the wheel on one side of a trailer may run. As the trailer wheel climbs back onto the pavement, the trailer experiences a sudden jolt which may induce fishtailing.

Irrespective of its source, fishtailing is dangerous for it may cause the driver of the tow vehicle to lose control of his vehicle. Moreover, fishtailing imposes severe stresses on the trailer hitch and the frame components to which it is attached, and may bend or fracture them. Fishtailing likewise imposes severe demands on the suspension system of the tow vehicle, and may cause components such as shock absorbers, bushings and springs to experience excessive wear or to fail.

While large over-the-road tractor-trailer combinations would, because of their size, seem more susceptible to fishtailing, they are not, and this to a large measure derives from the fact that the pivot axis for the trailer is set generally over the rear axle of the tractor. In vehicles with tandem rear axles, the pivot mechanism or fifth wheel as it is called is often located over the space between the two axles. In any event, tractor-trailer combinations do not pivot substantially behind the rear axle or axles of the tractor, and therefore these combinations possess good stability at high speeds.

Devices are currently available for reducing swaying and fishtailing, but these have the effect of stiffening the pivot joints at which they are used. They are not very effective, and they impose substantial stresses on the vehicular components to which they are attached, particularly when turns are negotiated. Heretofore, attempts have been made to stabilize trailers by employing converting linkages in the hitch mechanisms, with these linkages having the effect of displacing the effective pivot axis for the hitch mechanism forwardly, even though the hitch mechanism is not in any sense located in the region to which the axis is displaced. U.S. Pat. No. 4,019,754 shows such a linkage arrangement. Hitch mechanisms of this type cannot accommodate sharp turns of the type one may encounter in urban areas or in attempting to park a trailer in a confined parking place.

SUMMARY OF THE INVENTION

One of the principal objects of the present invention is to provide a trailer hitch assembly which, although being offset from the rear wheels of the tow vehicle to which it attaches, enables the towed vehicle to be moved without significant swaying or fishtailing, even in the presence of substantial side winds. Another object is to provide a hitch assembly of the type stated which, although being located to the rear of the tow vehicle, effectively places the pivot axis forwardly of its location. A further object is to provide a hitch assembly of the type stated which will accommodate the conventional sockets used with trailer tongues. An additional object is to provide a hitch assembly of the type stated that is suitable for use with conventional under car hitch receivers, including the type used with weight-distributing hitches. Still another object is to provide a hitch assembly of the type stated which is capable of accommodating sharp turns, so that the tow vehicle and towed vehicle, when connected, may negotiate turns of the type encountered in urban areas or in attempting to position the towed vehicle in a parking place. Yet another object is to provide a hitch assembly that is simple in construction, easy to manufacture, and reliable in service. These and other objects and advantages will become apparent hereinafter.

DESCRIPTION OF THE DRAWINGS

In the accompanying drawings which form part of the specification and wherein like numerals and letters refer to like parts wherever they occur.

DETAILED DESCRIPTION

Figure 1:
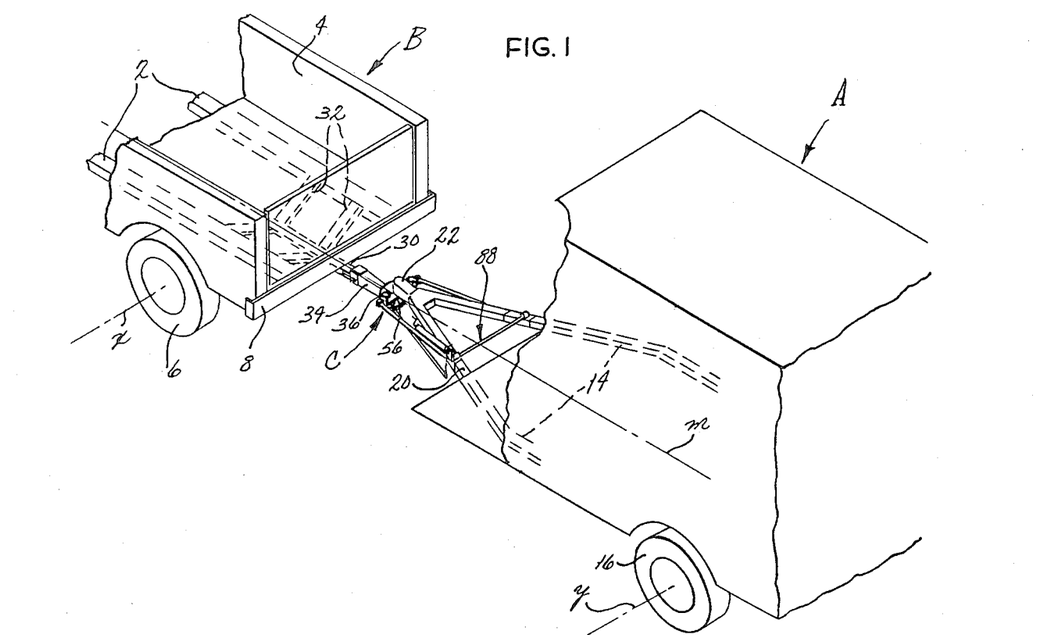
FIG. 1 is a perspective view of a trailer connected to a tow vehicle with a hitch assembly constructed in accordance with and embodying the present invention.

Referring now to the drawings, a trailer A (FIG. 1) is coupled to a tow vehicle B at a hitch assembly C, which is for the most part located at the very rear of the tow vehicle B so that it is easily accessible. Thus, the trailer A is easily and quickly connected to and disconnected from the tow vehicle B. Despite the location of the hitch assembly C well aft of the rear axle for the tow vehicle B, the trailer A and tow vehicle B when operated over the road as a combination possess amazing stability and exhibit little if any tendency to sway or fishtail when buffeted by cross winds or when otherwise subjected to lateral forces such as may be caused through the inertial effects of an uneven road surface. This stability derives from the fact that the effective pivot axis for the hitch assembly C, at least when the trailer A is directly behind and aligned with the tow vehicle B, is projected a considerable distance forwardly and may even be in the region of the rear axle for the tow vehicle B.

The tow vehicle B (FIG. 1) may be a conventional automobile, a van, or light truck, such as a pickup truck. As such it includes some type of framework 2 on which a body 4 is mounted and of course front and rear road wheels 6 on which the framework 2 is supported. At its trailing end the framework 2 supports a rear bumper 8. The rear wheels 6 revolve about an axis x which is essentially common to both rear wheels 6, even though they may be independently suspended, and this axis is located well ahead of the hitch assembly C, or at least the portion of the hitch assembly C at which the connection between the trailer A and tow vehicle B exists.

The trailer A (FIG. 1) has a frame 14 which is supported on wheels 16 that revolve about a common axis y, and the frame 14 in turn supports a trailer body 18. The front of the frame 14 forms a so-called tongue or A frame, in that it has side members 20 which converge forwardly and are connected at their forward ends to a coupler 22 containing a generally spherical socket 24 (FIGS. 4 & 6) that opens downwardly and is sized to receive a conventional trailer hitch ball. The coupler 22 also has a locking device 26 which will close upon the hitch ball and retain it in the socket 24.

Turning now to the hitch assembly C, it includes a hitch bar 30 (FIG. 1) that is mounted beneath the body 4 of the tow vehicle B along the longitudinal centerline m of the vehicle B. The hitch bar 30 projects rearwardly a short distance beyond the rear bumper 8, but is secured firmly to the framework 2 of the tow vehicle A by bracing 32 which is located for the most part ahead of the rear bumper 8.

Figures 4, 5, 6:
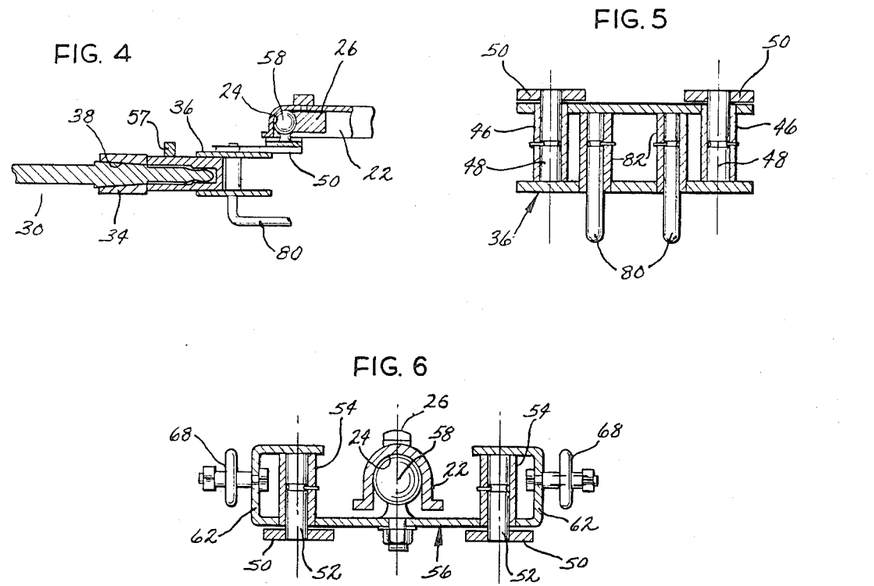
FIG. 4 is a sectional view of the hitch assembly taken along line 4—4 of FIG. 2.
FIG. 5 is a sectional view taken along line 5—5 of FIG. 2 and showing the front pivot mount of the hitch assembly.
FIG. 6 is a sectional view taken along line 6—6 of FIG. 2 and showing the rear pivot mount of the hitch assembly.

Fitted over the rearwardly projecting portion of the hitch bar 30, that is the portion which extends beyond the rear bumper 8, is a hitch box 34 (FIGS. 2 & 3) to which a pivot member or mount 36 is fastened securely such as by welding. The hitch box 34 has a forwardly opening socket 38 that is large enough to receive the hitch bar 30 without excessive free motion. Indeed to facilitate installation of the hitch box 34 over the hitch bar 30, the end of the hitch bar 30 and likewise the socket 38 of the hitch box 34 are tapered slightly on their upper and lower surfaces and on their side surfaces as well (FIG. 4).

Thus, the hitch bar 30 and hitch box 34 constitute connecting members for securing the pivot mount 36 in a fixed position with respect to the framework 2 of the tow vehicle B.

Figures 2, 3:
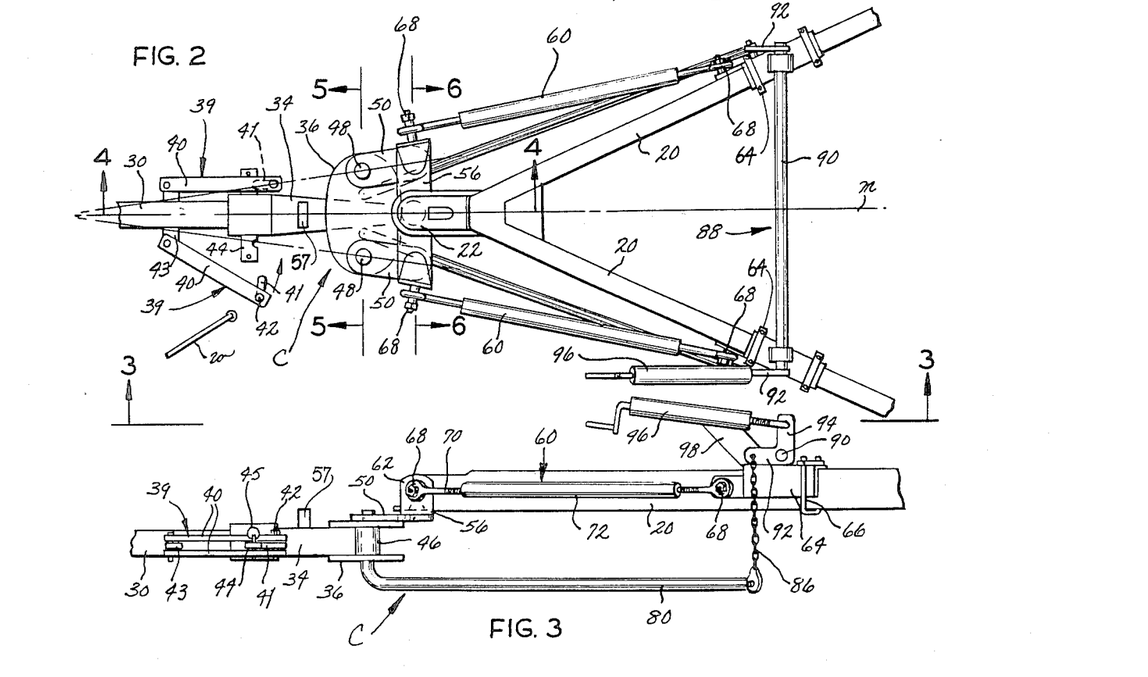
FIG. 2 is a top plan view of the hitch assembly.
FIG. 3 is a side elevational view of the hitch assembly taken along line 3—3 of FIG. 2.

The hitch box 34 is held securely on the end of the hitch bar 30 by two overcenter latches 39 (FIGS. 2 & 3), there being a latch 39 at each side of the hitch box 30. Each latch 39 includes a long toggle link 40 and a short toggle link 41 which are joined together at a pivot pin 42 that is fixed rigidly in one end of the short link 41, but has a hexagonal head exposed above the long link 40. Thus, the long link 40 at its one end turns relative to the pin 42 and in so doing pivots relative to the short link 41. The other end of the long link 40 is mounted on a tab 43 which projects laterally from the hitch bar 30 ahead of the hitch box 34, and indeed pivots relative to that tab. The short link 41 at its end remote from the pivot pin 42 is curved to engage a concave recess in another tab 44 which projects outwardly from the side of the hitch box 34. Indeed, when the two links 40 and 41 are alongside and against the hitch box 34 with the curved end of the latter in the recess of the tab 44, the latch 39 is in its overcenter condition—the condition in which it secures the hitch box 34 firmly to the hitch bar 30 (FIG. 2—right side of bar 30). When the links 40 and 41 are in this condition, the tab 44 on the hitch box 34 projects beyond the two links 40 and 41 and to insure that they remain overcenter or more specifically in the condition in which the short link 41 is engaged with the tab 44, a safety pin 45 is inserted through the tab 44 adjacent to the side of the long link 40. The short links 41 may have threaded end portions so that their lengths may be varied to accommodate the tabs 44 which they engage.

To release each of the overcenter latches 39, the safety pin 45 for that latch 39 is withdrawn from its tab 44. Then a wrench w is placed over the hex head on the pivot pin 42 that connects the two links 40 and 41.

The wrench w is turned in the direction that moves the connected ends of the two links 40 and 41 away from the side of the hitch box 34, and as it is turned the opposite end of the short link 41 rotates in the concave recess of the tab 44. After a few degrees of rotation, the short link passes overcenter, that is it passes beyond a condition in which it is parallel to the hitch bar 30. The two links 40 and 41 then swing freely away from the side of the hitch box 34, allowing the short link 41 to be totally disengaged from the tab 44 (FIG. 2—left side).

To couple the hitch box 34 with the hitch bar 30, the hitch bar 30 is inserted as far as possible into the socket 38 of the hitch box 34, and when so fitted, little if any, free motion exists either vertically or laterally by reason of the tapered configuration of the bar 30 and socket 38. Then the curved end of the short link 41 for one of the latches 39 is engaged with the concave recess in the tab 44 at that link 41. Next the wrench w is placed over the head of the pivot pin 42 which joins the short link 41 to its long link 40, and a torque is applied to the pin 42, causing the short link 41 to pivot toward the hitch box 34. Indeed, the two links 40 and 41 move overcenter and lodge against the side of the hitch box 34, thus, securing the hitch box 34 to the hitch bar 30. The safety pin 45 is then inserted through the outwardly projecting portion of the tab 44. The latch 39 on the other side of the hitch bar 30 is engaged with the hitch box 34 in a like manner.

The pivot mount 36 may consist of nothing more than two steel plates (FIGS. 4 & 5), each welded firmly to the hitch box 34 with the one being located about 3 inches above the other. Indeed, the plates may form opposite walls of 3 inch square steel tubing. In any event, the pivot mount 36 extends horizontally across the rear end of the hitch box 34 to which it is securely fastened, and carries two spaced apart bushings 46 which are set into it and function as bearings. The bushings 46 are closed at their lower ends, but open upwardly and have their axes parallel. Moreover, they are spaced equidistantly from the common centerline of the hitch box 34 and hitch bar 30, which is of course the longitudinal centerline m of the tow vehicle B. They are likewise spaced equidistantly from the rear bumper 8 and the axis x of the rear wheels 6 for the tow vehicle B, or in other words they are located along a line that is perpendicular to the centerline m. Where the mount 36 consists of spaced apart plates, the bushings 46 extend between the plates. The typical spacing between the axes of the two bushings 46 may be 7⅛ inches.

In each bushing 46 is a pivot pin 48 (FIGS. 2 & 5), which as its name implies rotates freely in its bushing 46, its lower end being against the closed lower end of the bushing 46. Yet the clearance between the pin 48 and bushing 46 is quite small, if any, so that side play is minimal. The pins 48 project upwardly out of their respective bushings 46, and each at its upper end is joined rigidly to a connecting link 50. The two connecting links 50 are equal in length and are directed rearwardly from their respective bushings 46 (FIG. 5). Each at its trailing end is fitted with another pivot pin 52 (FIG. 6) which is likewise rigidly joined to the link 50. The front and rear pins 48 and 52 for each link 50 are parallel, that is they have parallel axes which are oriented in the vertical direction. Since the two links 50 are equal in length, the spacing between the axes of the front and rear pins 48 and 52 of the one link 50 equals the spacing between axes of the front and rear pins 48 and 52 for the other link 50. That spacing should be about 4½ inches.

The rear pins 52 of the two links 50 project into bushings 54 (FIG. 6) that are set into another pivot member or mount 56 which is located slightly to the rear of the pivot mount 36 and likewise slightly above that mount. The bushings 54 of the rear pivot mount 56 are closed at their upper ends and likewise serve as bearings, with the pins 52 projecting downwardly from them. The bushings 54, while being parallel to each other like the bushings 46 of the pivot mount 36, are spaced somewhat further apart than the bushings 46, typically being about 7⅞ inches apart.

Figures 7, 10:
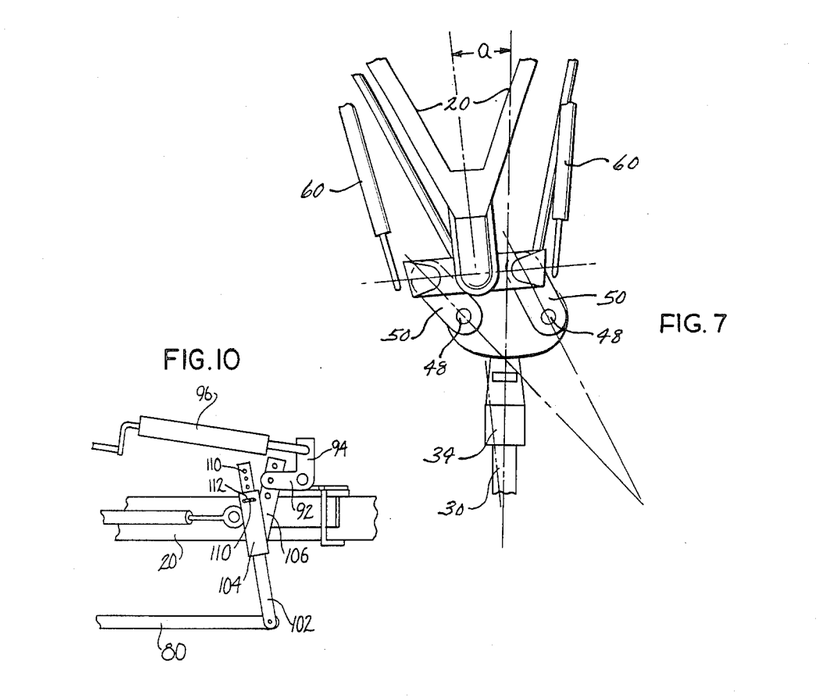
FIG. 7 is a plan view of the hitch assembly showing the configuration it would assume when the tow vehicle negotiates a relatively wide right turn.
FIG. 10 is a fragmentary elevational view showing a modification to the tightening device for the spring bars.
Figure 8:
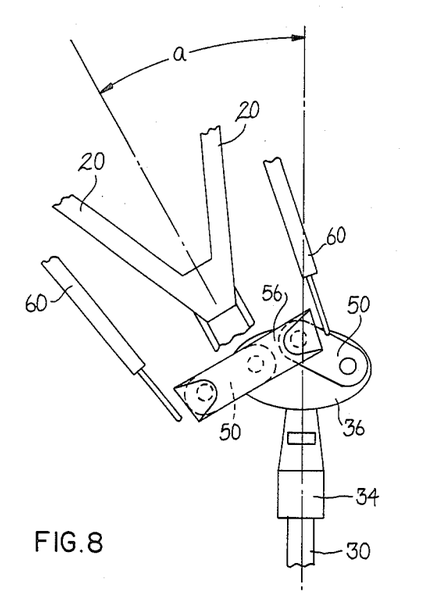
FIG. 8 is a plan view of the hitch assembly showing the configuration it would assume when the tow vehicle negotiates a sharper right turn.
Figure 9:
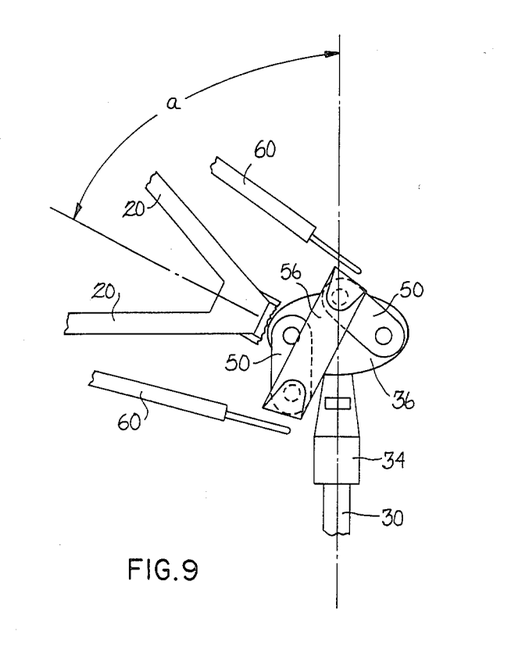
FIG. 9 is a plan view of the hitch assembly showing the configuration it would assume in a still sharper turn.

Thus, when the rear pivot mount 56 is centered behind the front pivot mount 36, that is when its bushings 54 are spaced equidistantly from the centerline m, the connecting links 50 converge forwardly. Indeed, the convergence is such that the links 50 if extended forwardly beyond the front pins 46 will meet along the centerline m, perhaps three to four feet ahead of the rear bumper 8, or more accurately lines extended forwardly through and perpendicular to the axes of the pins 52 and 46 for each link 50 will intersect along the centerline m of the vehicle at a point that is between the rear bumper 8 and the axis of the rear wheels 6 (FIG. 2). This symmetrical positioning of the links 50 only exists when the rear pivot mount 56 is directly behind the front mount 36 and hitch bar 30, for when the rear mount 56 is shifted to one side or the other, the intersection of the lines transfers to points which are located closer to the bumper 8 and offset from the centerline m (FIG. 7). Indeed, the geometry of the arrangement is such that the rear pivot member 56 may move to a position in which it lies directly over and parallel to one of the links 50 (FIG. 8) and even beyond that position into a position where one of the links 50 projects straight forwardly, while the other projects generally rearwardly (FIG. 9). In the latter position, the angle between the rear pivot mount 56 and the front pivot mount 36 is quite large and, of course, the angle a between the centerline m of the trailer A and the centerline m of the tow vehicle B is of a corresponding magnitude. Projecting upwardly from the upper surface of the hitch box 34 is a stop 57 which lies in the arcs of rotation for the links 50 and prevents either link 50 from passing completely over the hitch box 34.

To prevent the pivot pins 48 and 52 from moving axially in their respective bushings 46 and 54, the pins 48 and 52 are provided midway between their ends with annular grooves, while the bushings 46 and 54 are fitted with retaining pins that project radially into the grooves. These retaining pins do not prevent the pivot pins 48 and 52 from bearing against the closed ends of their respective bushings 48 and 52, and indeed those ends like the cylindrical walls serve as bearing surfaces Midway between its bushings 54, the rear pivot mount 56 carries a conventional hitch ball 58 which is attached firmly to the mount 56 and projects upwardly from it. Thus, when the rear mount 56 is centered with respect to the front mount 36 and the hitch box 34, which is the condition in which the links 50 lie symmetrical on each side of the centerline m, the hitch ball 58 will be located along the centerline m (FIG. 2).

The coupler 22 on the front end of the trailer A attaches to the hitch ball 58 on the rear pivot mount 56, or in other words the hitch ball 58 fits into the socket 24 of the coupler 22, the locking device 26 holding the two together (FIGS. 4 & 6). Ordinarily, the typical ball-and-socket trailer hitch accommodates universal movement, but in the hitch assembly C the trailer A is prevented from turning relative to the hitch ball 58, that is rotating about a vertical axis, by a pair of struts 60 (FIGS. 2 & 3) which extend between the ends of the mount 56 and the converging side members 20 that form part of the trailer frame 14. More specifically, the rear pivot mount 56 at its ends is provided with upwardly directed tabs 62 (FIG. 6) which at their upper ends turn over and close the tops of the rear bushings 54. Indeed, each bushing 54 is attached at both of its ends to the rear mount 56. Being at the ends of the rear mount 56, the tabs 62 are located to the sides of the hitch ball 58 and the coupler 22 which fits over that ball. The trailer A, on the other hand, along each of side members 20 is fitted with frame brackets 64 which are clamped firmly in place by U-bolts 66. The struts 60 extend between the tabs 62 on the rear mount 56 and the brackets 64 of the trailer frame 14, each being connected to its tab 62 and bracket 64 through swivel fittings 68 to enable a limited amount of rocking movement between the trailer frame 14 and the cross bar 56 of the hitch assembly C. The swivel fittings at the tabs 62 should be at the same elevation as the center of the hitch ball 58, so if the ball 58 is raised, the front swivel fittings 68 should likewise be raised.

In this connection, the struts 60 prevent the trailer frame from rotating relative to the hitch ball 58 about a vertical axis, and as a result this movement is accommodated by the connecting links 50. Nevertheless, the trailer A may tilt one way or the other with respect to the tow vehicle B as might be expected on uneven road surfaces. When this occurs, the coupler 22 merely turns slightly on the hitch ball 58 about an axis of rotation that extends longitudinally through the trailer A. Likewise the trailer A may rock forwardly or backwardly relative to the tow vehicle B, and when this occurs, the coupler 22 rotates on the hitch ball 58 about an axis that extends transversely through the ball 58. Since the swivel fittings 68 do not lock the struts 60 rigidly to either the rear mount 56 or the trailer frame 14, they do not inhibit the rocking motion about the longitudinal or transverse axes.

Preferably each strut 60 includes a pair of eye bolts 70 at which the strut 60 is connected to the swivel fittings 68 and a tube 72 which extends between the eye bolts 70. Indeed, the tube 72 is threaded at its ends and the eye bolts 70 thread into the tube 72, so that the strut 60 functions much like a turnbuckle. Thus, when the tube 72 is turned relative to the eye bolt 70, the length of the strut 60 changes, and this facilitates installing the hitch assembly C on the trailer A and enables the rear mount 56 to be adjusted to a position in which a line passing through the axes of its bushings 54 is parallel to the axis y of the trailer wheels 18, as it should be for proper operation of the hitch assembly C.

Where the so-called tongue weight of the trailer A is quite heavy, it is desirable to redistribute the weight of the trailer A somewhat, so that more of it is carried by the wheels of the trailer A and the front wheels of the tow vehicle B and less of it by the rear wheels 6 of the tow vehicle B. To this end the hitch assembly C may be fitted with spring bars 80 (FIGS. 2 & 3) that extend between the front pivot mount 36 and the trailer frame 14 and are stressed such that the rear of the tow vehicle B is urged upwardly. This increases the force at the hitch ball 58 significantly above that of the normal tongue weight for the trailer A. Spring bars have long been used in conjunction with trailer hitches to achieve better weight distribution, and the principle by which they operate will therefore not be described.

The spring bars 80 for the most part extend generally horizontally, but each at its forward end turns upwardly where it is received in more bushings 82 (FIG. 5) which are located in the front pivot mount 36, much the same as and parallel to the bushings 46 for the links 50. However, the bushings 82 are set inwardly from the bushings 46 and are closed at their upper ends by the upper plate of the mount 36. The upwardly turned forward ends of the spring bars 80 project through the bushings 82 and bear against the undersurface of the top plate for the mount 36. The spring bars 80 are prevented from dropping downwardly and working out of the bushings 46 by small pins which extend from the bushings 82 radially into grooves that open out of the upwardly turned portions of the spring bars 80.

The spring bars 80 extend rearwardly from the front pivot mount 36 and at their rear ends are connected to the frame brackets 64 through chains 86 and a chain tightening device 88 (FIGS. 2 & 3) which controls the tension in the chains 86 and likewise the stress in the spring bars 80. The tightening device 88 includes a torque tube 90 which is mounted in bearings attached to the two brackets 64 and thus extends between those brackets 64. At one end it is provided with a torque arm 92 that extends forwardly and indeed the chain 86 at that end is connected to that torque arm 92. At its other end the torque tube 90 is fitted with another torque arm 92 that forms part of a bell crank 94. The other arm 92 likewise extends forwardly and indeed corresponds in angle and position to the single torque arm 92. The forwardly directed torque arm 92 of the bell crank 94 has the chain 86 for the other spring bar 80 connected to it. The other arm of the bell crank 94 projects upwardly and is attached to a screw jack 96 which is mounted by means of a bracket 98 on the frame bracket 74 at which the bell crank 94 is located.

When the screw jack 96 is turned, the torque tube 90 rotates and moves the forward ends of the torque arms 92 upwardly or downwardly and the chains 86 as well. This of course alters the stress in the spring bars 80. Thus, the jack 96 controls the amount of weight that is redistributed to the front wheels 6 of the tow vehicle B and the wheels 16 of the trailer A.

Since the forward ends of the spring bars 80 are free to turn in the bushings 82, the spring bars 80 accommodate any turning of the tow vehicle B relative to the trailer A. The connecting chains 86, inasmuch as they are free to pivot relative to the frame brackets 64 and the rear ends of the spring bars 80, permit the rear ends of the spring bars 80 to shift relative to the trailer frame 14 during turns and other relative movement between the trailer A and tow vehicle B.

In use, the hitch assembly C couples the trailer A to the tow vehicle B such that the combination of the two is extremely stable at high speeds, even in the presence of gusty side winds or on uneven road surfaces. This derives from the fact that the effective pivot axis for the trailer, at least when it is aligned directly behind the tow vehicle B, is between the rear bumper 8 and the axis x for the rear wheels 6 of the vehicle B (FIG. 2), and not at the rear bumper 8 where the actual pivoting is accommodated. In this regard, the towing force is transmitted through the hitch bar 30 to the hitch box 34 and front pivot mount 36 and thence through the connecting links 50 to the rear pivot mount 56 to which the trailer A is connected at the hitch ball 58. Since the struts 60 prevent the trailer A from turning with respect to the rear pivot mount 56, that is rotating about a vertical axis at the hitch ball 58, the turning must be accommodated through the connecting links 50, the pins 40 and 52 of those links, and the bushings 46 and 54 in which the pins 40 and 52 fit. The bushings 46 and 52 are spaced such that the connecting links 50 converge and indeed if projected forwardly would meet along the centerline m of the tow vehicle B somewhat ahead of the rear bumper 8, but most likely behind the axis x for the rear wheels 6, assuming of course that the trailer A is aligned with the tow vehicle B, that is directly behind the tow vehicle B, as would occur while driving straight segments of highway. By displacing the pivot point forwardly, the tendency to sway or fishtail is significantly reduced. Actual tests of applicant's hitch assembly C have demonstrated a marked reduction in fishtailing.

When the tow vehicle B and trailer A negotiate a curved segment of road, the links 50 rotate slightly with respect to both the front pivot mount 36 and the rear pivot mount 56 which they connect (FIG. 7), this occurring upon entering the curve as well as upon leaving it. While in the curve, the links 50 are no longer disposed at equal angles with respect to the centerline m of the tow vehicle B, and indeed one link 50 could be at a substantially greater angle than the other. This displaces the effective pivot point rearwardly and to one side or the other, but curves which require a major displacement of the effective pivot point can only be negotiated at slow speeds—speeds at which side winds are not likely to induce fishtailing. In the case of gentle curves which may be taken at high speeds, the connecting links 50 may be at slightly different angles with respect to the centerline m of the tow vehicle B, but the change in angles is not enough to displace the effective pivot point such and it remains close to the centerline m well ahead of the rear bumper 8. Thus, the combination of the tow vehicle B and trailer A likewise possesses good stability in high speed curves.

Since the front pivot mount 36 lies beneath the links 50 and the rear pivot mount 56 lies above the links 50, the latter never comes against the former as it moves with the trailing ends of the links 50 which of course occurs when the tow vehicle B and trailer A negotiate a turn. This arrangement of the pivot mounts 36 and 56 and links 50 enables the hitch assembly C to accommodate extremely sharp turns, that is turns in which the centerline m of the trailer A is at a substantial angle a with respect to the centerline m of the tow vehicle B (FIGS. 8 and 9). Indeed, when such curves are encountered, the rear mount 56 merely passes over the front mount 36, and in so doing carries one of the links 50 to a position in which it lies directly below and parallel to the rear mount 56 (FIG. 8). In this position the rear mount 56 is presented at a relatively large angle with respect to the front mount 36, but that angle may be increased even more, for the links 50 are free to swing forwardly, and when one link 50 is projected straight forwardly and the other generally rearwardly, the rear mount 56 is at a substantial angle a with respect to the front mount 36 (FIG. 9), the position it would assume in an extremely sharp turn. The stop 57 prevents the forwardly projected link 50 from passing much beyond the straight forward position. Thus, the hitch assembly C permits the tow vehicle B and trailer A to negotiate the sharp turns one would expect to encounter in urban areas, and further enables the tow vehicle B to back the trailer A into an extremely confined parking area—a maneuver which often requires the tow vehicle B to be jacked sharply with respect to the trailer A.

Irrespective of the type of curve no turning occurs between the trailer coupler 22 and the hitch ball 58, that is rotation about a vertical axis. The struts 60 prevent such rotation. Even so, the coupler 22 and hitch ball 58 do enable the trailer A to rock left or right and forwardly and backwardly with respect to the tow vehicle B. In other words, the trailer coupler 22 and hitch ball 58 accommodate rotation of the trailer A relative to the tow vehicle B about the longitudinal axis of the trailer A and also about a transverse axis extending through the hitch ball 58.

The spring bars 80, if used, redistribute the tongue load of the trailer A so not as much of it is carried by the rear wheels 6 of the tow vehicle B, yet they do not restrict the previously described rotational movements. In this regard, the spring bars 80 at their forward ends pivot in the bushings 82 of the forward pivot mount 36 and thus accommodate turns. The left and right rocking as well as the up and down rocking are, on the other hand, accommodated through flexure of the bars 80. While the spring bars 80 do increase the reaction force at the hitch ball 58, the hitch ball 58 and the coupler socket 24 in which it fits experience less wear than in conventional hitch arrangements, because in the hitch assembly C turning motion about the vertical axis is eliminated.

While it is possible to in effect connect and disconnect the tow vehicle B and trailer A at the hitch ball 58, it is much simpler to connect and disconnect at the hitch bar 30. This procedure begins with the coupler 22 already locked to the hitch ball 58, the struts 60 in place, and likewise the spring bars 80 in place if they are employed. In that case the hitch bar 30 on the tow vehicle B is merely aligned with the socket 38 in the hitch box 38, whereupon the tow vehicle B is backed slowly, causing the hitch bar 30 to enter the socket 38. When the hitch bar 30 is fully inserted, the overcenter latches 39 are engaged with their respective tabs 44 on the hitch box 34, and with the wrench w the latches 39 are moved overcenter to securely connect the hitch bar 30 and hitch box 34 (FIG. 3). The safety pins 45 are then installed. The spring bars 80, if used, are at their trailing ends drawn upwardly with the jack 96 of the tightening device 88. The trailer A may be disconnected from the tow vehicle B in reverse sequence.

To avoid relaxing the chains 86 when the trailer A is disconnected from the tow vehicle B and again tightening them when it is reconnected, a link assembly 100 (FIG. 10) may be substituted for the chains 86. The link assembly 100 includes a rod 102, a sleeve 104 through which the rod 102 passes, and a bracket 106 which is welded to the side of the sleeve 104 and projects obliquely from it. At its lower end, the rod 102 possesses a clevis by which it is connected to the trailing end of one of the spring bars 80. The rod 102 fits into the sleeve 104 loosely enough to slide and turn relatively easily in the sleeve 104 when not otherwise connected, and near its upper end the rod 102 has a succession of holes 108. The sleeve 104, on the other hand, has an elongated hole 110, which extends circumferentially. Thus, by moving the rod 102 axially in the sleeve 104, the rod 102 can be brought to a position in which one of the holes 108 in it aligns with the elongated hole 110 in the sleeve 104, so that a pin 112 may be inserted through the two to join the rod 102 and sleeve 104 together. By reason of the elongation in the hole 110, the rod 102 can turn somewhat in the sleeve 104. The bracket 106, on the other hand, is connected to one of the torque arms 92 at another pin 114.

In lieu of forming the front pivot mount 36 from spaced apart plates or the rear pivot mount 56 from a plate with ends turned up and over, each mount may be formed from a heavy tube stock of square cross-sectional configuration. In that case the bushings 46, 54 and 82 would extend between opposite walls of their respective tubular pivot mounts 36 and 56.

This invention is intended to cover all changes and modifications of the example of the invention herein chosen for purposes of the disclosure which do not constitute departures from the spirit and scope of the invention.

What is claimed is:

1. In combination with a tow vehicle having a body and rear wheels and a trailer having a frame and wheels, an improved hitch assembly for coupling the trailer to the row vehicle, said hitch assembly comprising: a first pivot member mounted on the tow vehicle; a second pivot member attached to the frame of the trailer at the forward end of that frame such that it is restricted from turning relative to the trailer about a generally vertical axis; and a pair of connecting links, each pivotally connected to the first and second members and extended between those members, with the pivotal connection between the first member and each link being normally located ahead of the pivotal connection between that link and the second member insofar as the normal direction of advance for the tow vehicle and trailer is concerned so that the links normally extend rearwardly from the first member to the second member, the pivotal connections between each member and the two links being spaced apart, with the spacing between the pivotal connections on the second member being greater than the spacing between the pivotal connections on the first member, whereby the links normally converge forwardly, either one of the links when on the inside of a turn being capable of swinging with the second member to a position in which it is substantially reversed from its normal position so that the pivotal connection between that link and the second member is located substantially ahead of the pivotal connection between that link and the first member, while the pivotal connection between the other link and the first member remains generally ahead of the pivotal connection between that other link and the second member, all without the links and members interfering with each other, whereby the angular position of the second member relative to the first member can be varied substantially to enable the tow vehicle and trailer to negotiate sharp turns.

2. The combination according to claim 1 wherein the first and second members have bearings with the axes of the bearings being parallel and the links have pins which extend into the bearings, thus providing the pivotal connections between the links and the first and second pivot members.

3. The combination according to claim 2 wherein bearings for the first member are the same distance from the axis for the rear wheels of the tow vehicle and the bearings for the second member are the same distance from the axis for the wheels of the trailer.

4. The combination according to claim 3 wherein the trailer has a longitudinal centerline and the bearings for the second member are also spaced generally equidistantly from the longitudinal centerline of the trailer, there being one bearing on one side of that centerline and another on the other side.

5. The combination according to claim 1 wherein straight lines passing through and perpendicular to the pivot axes of the two connecting links will intersect in the region behind the axis for the rear wheels of the tow vehicle and ahead of the rear of the body.

6. The combination according to claim 1 wherein the trailer also includes at the forward end of its frame a coupler that contains a socket; and further comprising a hitch ball on the second member between the locations at which the connecting links are pivotally connected to the second member.

7. The combination according to claim 6 and further comprising struts connected to the second member remote from the hitch ball and also to the trailer frame remote from the socket which receives the hitch ball to prevent the second member from rotating relative to the frame about a vertical axis.

8. The combination according to claim 7 and further comprising a hitch bar mounted firmly with respect to the body of the tow vehicle generally parallel to the longitudinal axis of the vehicle and a hitch box fitted over the end of the hitch bar, yet being detachable from the bar; the first member being mounted in a fixed position on the hitch box.

9. The combination according to claim 1 and further comprising spring bars pivotally connected to the first member and to the trailer frame and being stressed so as to lessen the load on the rear wheels of the tow vehicle.

10. The combination according to claim 9 and further comprising a torque tube extended across the trailer frame at the rear ends of the spring bars, torque arms attached to the torque tube, flexible means for connecting the rear ends of the spring bars with the torque arms, and means for turning the torque tube, whereby the stress in the spring bars may be altered.

11. The combination according to claim 9 wherein each spring bar is connected to the trailer frame through a link assembly which in use has a fixed length but accommodates some rotation.

12. A hitch assembly for coupling a trailer to a tow vehicle, said hitch assembly comprising: a first pivot member adapted to be attached to the tow vehicle; a second pivot member adapted to be attached to the trailer and being offset vertically with respect to the first pivot member; a pair of connecting links extended between the first and second members with each link being pivotally connected to the first member at a first pivot axis and also to the second member at a second pivot axis such that the second member may swing from a normal position to a substantially angulated position without the links and members interfering with each other, the pivotal connections between the links and the first member, with reference to the normal direction of movement for the tow vehicle and trailer, being normally located ahead of the pivotal connections between the links and the second member, so the first pivot axes are normally ahead the second pivot axes, the pivotal connections between the links and the first member being spaced closer together than the pivotal connections between the links and the second member, so that the second pivot axes are spaced farther apart than the first pivot axes, whereby the links normally converge forwardly, the links and second member being capable of moving with respect to the first member such that when the second member approaches it substantially angulated position, one link undergoes a substantial reversal from its normal position, whereby the second pivot axis for that one link is ahead of the first pivot axis for that link, while the other link is directed generally laterally and rearwardly so that second pivot axis of that other link remains generally behind the first pivot axis of that link, all to enable the tow vehicle and trailer to negotiate sharp turns.

13. A hitch assembly according to claim 12 wherein the first and second members have bearings at the locations of their pivotal connections with the connecting links and the connecting links are provided with pins which fit into and are capable of rotating within the bearings.

14. A hitch assembly according to claim 12 and further comprising: a hitch ball on the second member, the hitch ball being adapted to fit into a socket of a coupler on the trailer, and restraining means for connecting the second member with the trailer so as to prevent the second member from turning relative to the coupler about a generally vertical axis when the hitch ball is in the socket of the coupler.

15. A hitch assembly according to claim 14 and further comprising brackets adapted to be attached, to the trailer rearwardly from its coupler, and wherein the restraining means comprises struts which are connected between the second member and the bracket, the struts being connected to the second member remote from the hitch ball.

16. A hitch assembly according to claim 14 wherein the hitch ball is mounted midway between the locations at which the connecting links are pivotally connected to the second member.

17. A hitch assembly according to claim 16 wherein the distance between two pivotal connections for the one link is equal to the distance between the two pivotal connections for the other link.

18. In combination with a tow vehicle having a body and rear wheels and a trailer having a frame and wheels, with the frame at its forward end having a coupler that contains a socket, an improved hitch assembly for coupling the trailer to the tow vehicle, said hitch assembly comprising: a hitch bar mounted firmly with respect to the body of the tow vehicle generally parallel to the longitudinal axis of the vehicle; a hitch box fitted over the end of the hitch bar, yet being detachable from the bar; over-center clamps connecting the hitch bar and hitch box, one to the other; a first pivot member mounted in a fixed position on the hitch box; a second pivot member attached to the frame of the trailer at the forward end of that frame such that it is restricted from turning relative to the trailer about a generally vertical axis, the second pivot member being offset vertically with respect to the first pivot member; a pair of connecting links, each pivotally connected to the first and second members and extended between those members, with the pivotal connection between the first member and each link being located ahead of the pivotal connection between that link and the second member insofar a the normal direction of advance for the tow vehicle and trailer is concerned, the links converging forwardly; a hitch ball on the second member between the locations at which the connecting links are pivotally connected to the second member, the hitch ball being received in the socket of the coupler on the trailer frame; and struts connected to the second member remote from the hitch ball and also to the trailer frame remote from the socket which receives the hitch ball to prevent the second member from rotating relative to the frame about a vertical axis.

19. A hitch assembly for coupling a trailer to a tow vehicle, said hitch assembly comprising: a first pivot member adapted to be attached to the tow vehicle in a fixed position with respect to that vehicle; a second pivot member adapted to be attached to the trailer and being offset above the first pivot member; a pair of connecting links extended between the first and second members with each link being pivotally connected to the first member and also to the second member such that the second member may swing to a position in which it is located generally over the first member, the pivotal connections between the first member and the links being normally located ahead of the pivotal connections between the second member and the links insofar as the normal direction of movement for the tow vehcile and trailer is concerned, the pivotal connections between the links and the first member being spaced closser together than the pivotal connections between the links and the second member, whereby the links normally converge forwardly, yet enable the tow vehicle and trailer to negotiate turns.

20. In combination with a tow vehicle having a body and rear wheels and a trailer having a frame and wheels, an improved hitch assembly for coupling the trailer to the tow vehicle, said hitch assembly comprising: a hitch bar mounted firmly with respect to the body of the two vehicle generally parallel to the longitudinal axis of the vehicle; a hitch box fitted over the end of the hitch bar, yet being detachable from the bar; over-center clamps extending between hitch box; a first pivot member mounted on the hitch box so that it is in a fixed position with respect to the tow vehicle; a second pivot member attached to the frame of the trailer at the forward end of that frame such that it is restricted from turning relative to the trailer about a generally vertical axis; a pair of connecting links, each pivotally connected to the first and second members and extended between those members, with the pivotal connection between the first member and each link normally being ahead of the pivtal connection between that link and the second member, the links converging forwardly.

21. The combination according to claim 19 wherein the hitch box has a socket which receives the hitch bar, the socket being defined at least inpart by tapered surfaces, and the hitch bar has tapered surfaces which seat against the tapered surfaces of the socket when the hitch box and hitch bar are connected together by over-center clamps.

22. In combination with a tow vehicle having a body and rear wheels and a trailer having a frame and wheels, an improved hitch assembly for coupling the trailer to the tow vehicle, said hitch assembly comprising: first and second connecting members which are separable but are normally connected, the first connecting member further being attached securely to the tow vehicle, one of the connecting members having a socket provided with an open end and being defined at least in part by tapered surfaces which diverge toward the open end, the other connecting member, when attached to the first connecting member, being received in the socket of the first connecting member and having tapered surfaces which seat against the tapered surfaces of the first connecting member; means for holding the two connecting members together with their tapered surfaces against each other, whereby the second connecting member is fixed firmly in position with respect to the first connecting member; a first pivot member mounted in a fixed position on the second connecting member; a second pivot member attached to the frame of the trailer at the forward end of that frame such that it is restricted from turning relative to the trailer about a generally vertical axis, the second pivot member being offset vertically with respect to the first pivot member; and a pair of connecting links, each pivotally connected to the first and second members and extended between those members, with the pivotal connection between the first member and each link being normally located ahead of the pivotal connection between that link and the second member insofar as the normal direction of advance for the two vehicle and trailer is concerned, the links converging forwardly.

* * * * *

UNITED STATES PATENT AND TRADEMARK OFFICE
CERTIFICATE OF CORRECTION

PATENT NO. : 4,722,542
DATED : February 2, 1988
INVENTOR(S) : James C. Hensley

It is certified that error appears in the above-identified patent and that said Letters Patent is hereby corrected as shown below: On the title page Under "References Cited", Kober "4,502,562" should be "4,502,561".

Column 2, line 5, "converting" should be "converging".

Column 6, line 26, there should be a period after "surfaces".

Column 9, line 8, "such" should be "much".

Column 10, line 60, claim 1, "row" should be "tow".

Column 12, line 63, claim 15, there should not be a comma after "attached".

Column 13, line 30(actual), claim 18, "a" should be "as".

Column 14, line 7, claim 20, "two" should be "tow".

Column 14, line 11, claim 20, "bar and hitch box and connecting the hitch bar to the hitch" should be inserted between "hitch" and "box".

Column 14, line 21, claim 20, "pivtal" should be "pivotal".

UNITED STATES PATENT AND TRADEMARK OFFICE
CERTIFICATE OF CORRECTION

PATENT NO. : 4,722,542

DATED : February 2, 1988

INVENTOR(S) : James C. Hensley

It is certified that error appears in the above-identified patent and that said Letters Patent is hereby corrected as shown below:

Column 14, line 23, claim 21, Claim 21 should depend from claim 20, not claim 19.

Column 14, line 25, claim 21, "inpart" should be two separate words.

Signed and Sealed this

Nineteenth Day of July, 1988

Attest:

DONALD J. QUIGG

*Attesting Officer*  *Commissioner of Patents and Trademarks*